Figure 1:
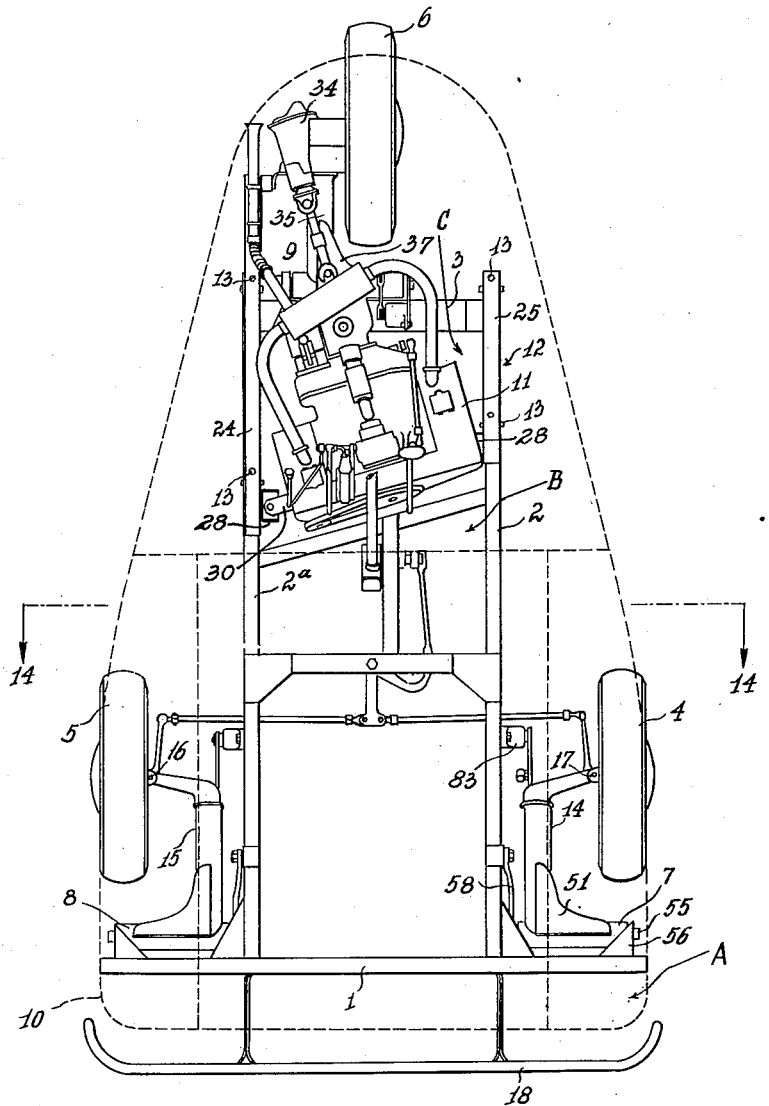

Nov. 6, 1951 W. S. TANDLER ET AL 2,574,199
THREE-WHEEL AUTOMOTIVE VEHICLE
Filed March 1, 1946 6 Sheets-Sheet 1

INVENTOR.
WILLIAM S. TANDLER
DAVID S. WALKER
BY FERDINAND A. DE WEISS
JOHN L. FRERING

ATTORNEY

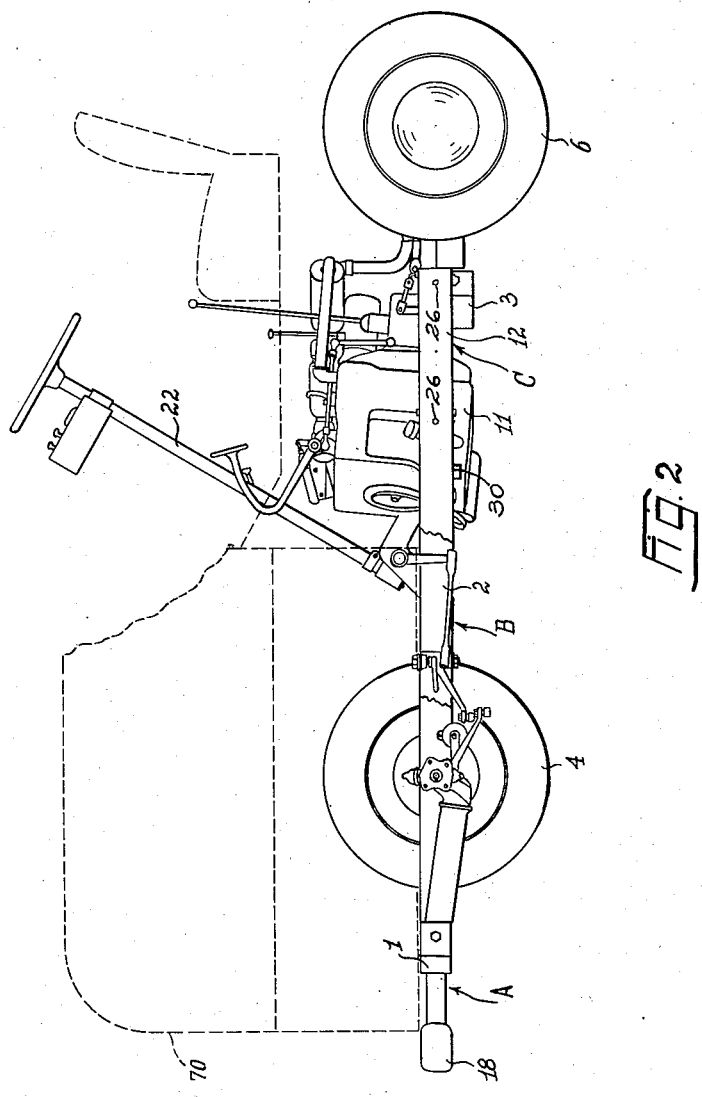

Nov. 6, 1951 W. S. TANDLER ET AL 2,574,199
THREE-WHEEL AUTOMOTIVE VEHICLE
Filed March 1, 1946 6 Sheets-Sheet 3
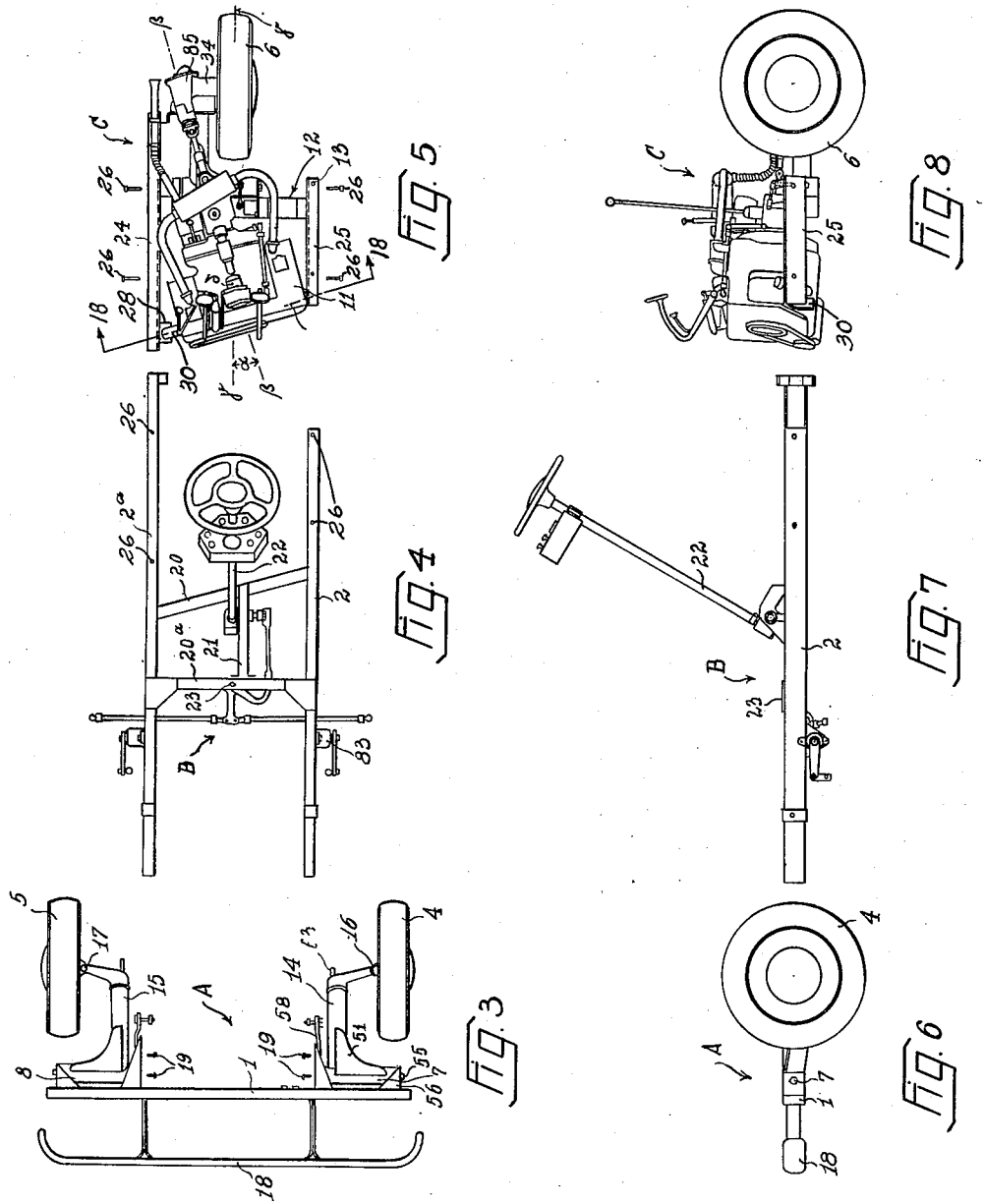
INVENTOR.
WILLIAM S. TANDLER
DAVID S. WALKER
BY FERDINAND A. DE WEISS
JOHN L. FRERING
ATTORNEY Nov. 6, 1951 W. S. TANDLER ET AL 2,574,199
THREE-WHEEL AUTOMOTIVE VEHICLE
Filed March 1, 1946 6 Sheets-Sheet 4
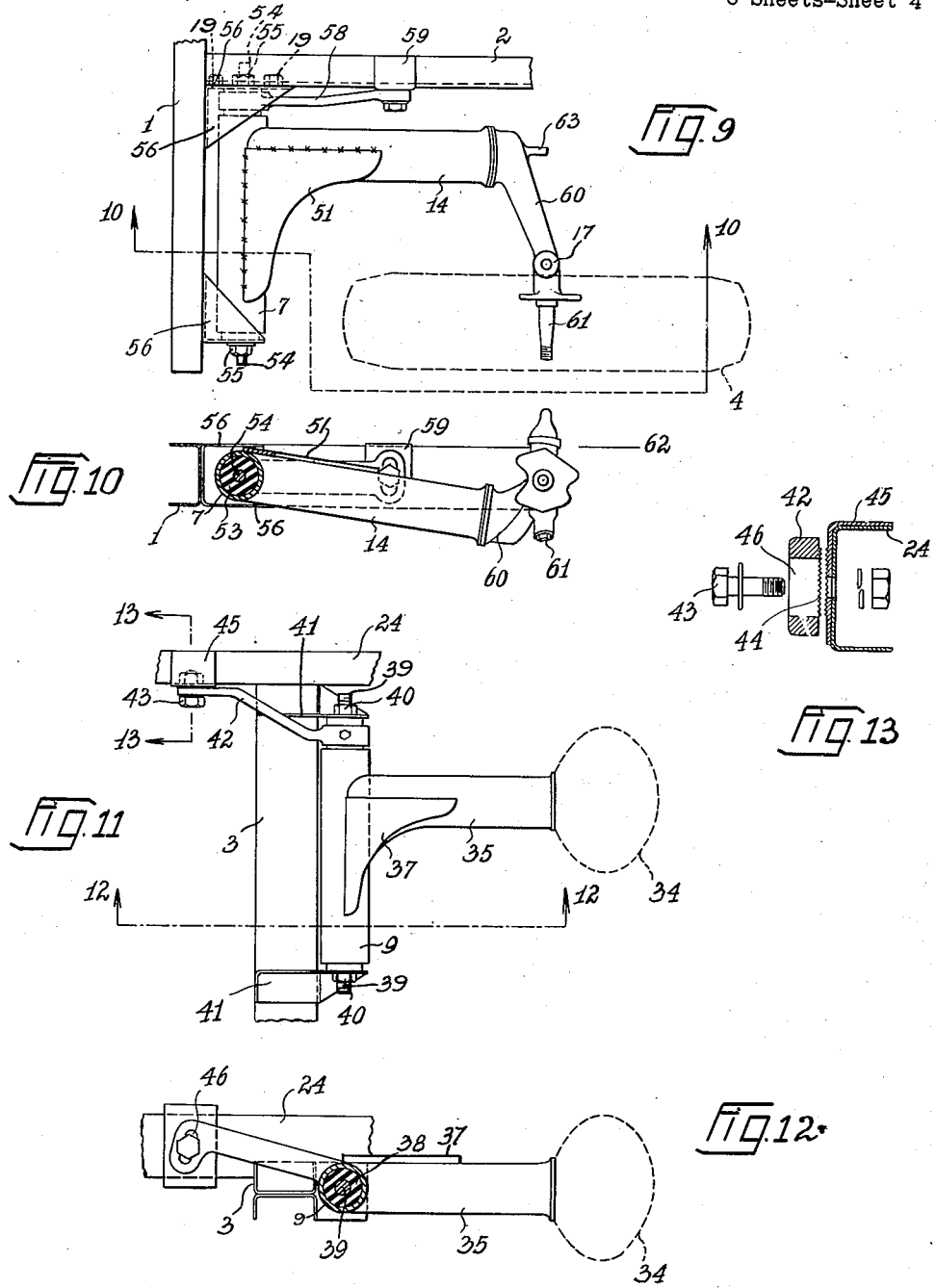
INVENTOR.
WILLIAM S. TANDLER
DAVID S. WALKER
FERDINAND A DE WEISS
BY JOHN L. FRERING
ATTORNEY Nov. 6, 1951  W. S. TANDLER ET AL  2,574,199
THREE-WHEEL AUTOMOTIVE VEHICLE
Filed March 1, 1946  6 Sheets-Sheet 5
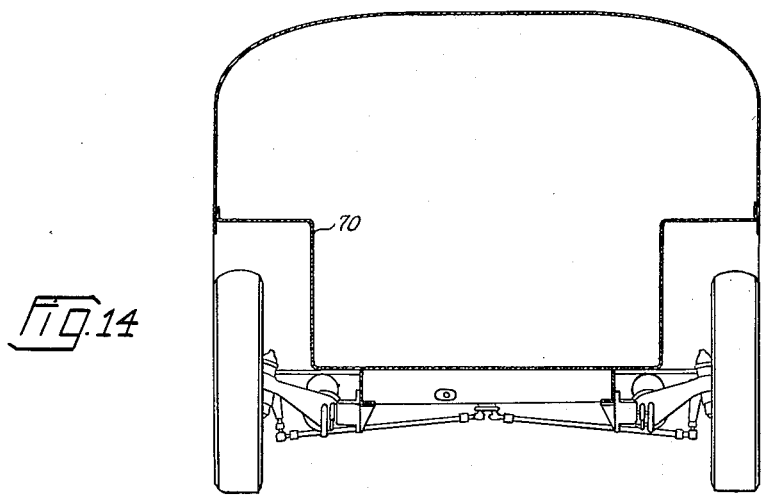
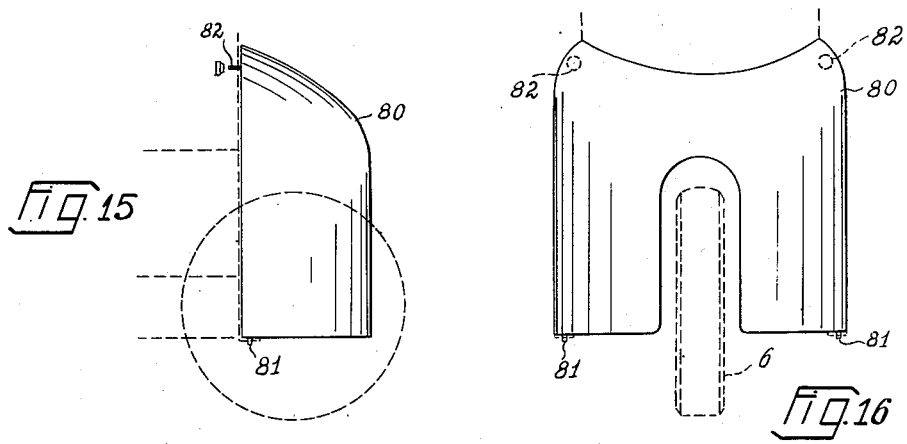
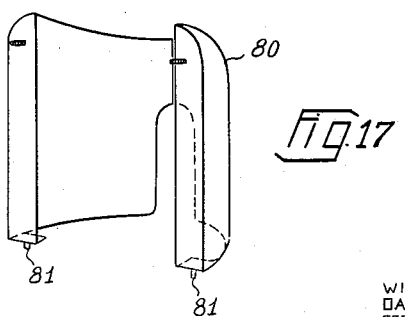
INVENTOR.
WILLIAM S. TANDLER
DAVID S. WALKER
FERDINAND A. DE WEISS
BY JOHN L. FRERING
ATTORNEY

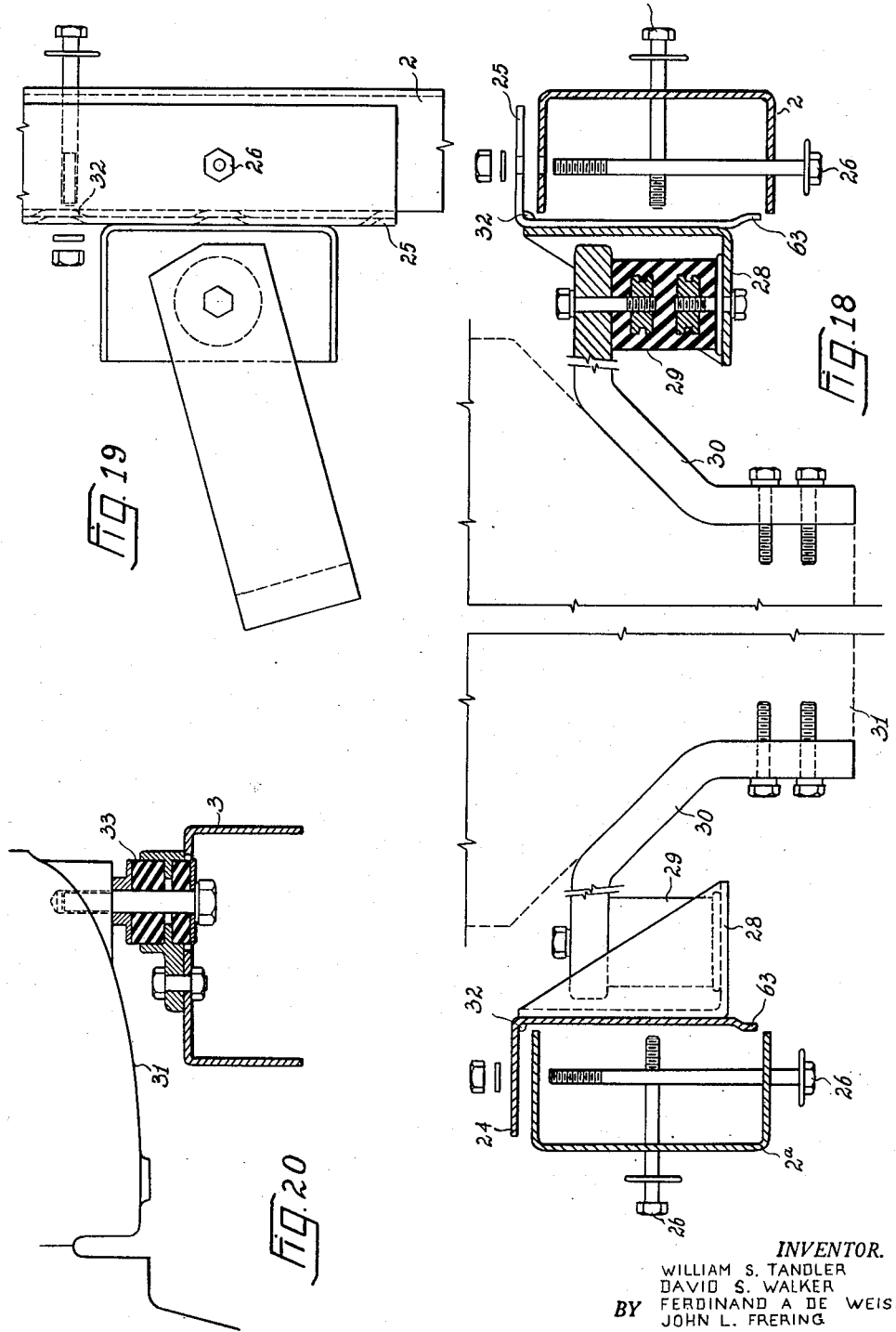

Patented Nov. 6, 1951

2,574,199

UNITED STATES PATENT OFFICE 2,574,199

THREE-WHEEL AUTOMOTIVE VEHICLE

William S. Tandler, Ferdinand A. de Weiss, David S. Walker, and John L. Frering, New York, N. Y., assignors to Industrial Scientific Company, New York, N. Y.

Application March 1, 1946, Serial No. 651,216

4 Claims. (Cl. 180—25)

The invention relates to a three wheel automotive vehicle and particularly to a three wheel automotive delivery vehicle. The essential elements of this vehicle are designed for this particular purpose.

Therefore it is the main object of the invention to provide a three wheel automotive vehicle which possesses advantages with regard to its delivery functions, which has a maximum loading capacity, an easy maneuverability and easy accessibility by the driver.

It is another important object of the invention to provide a three wheel delivery vehic'e which can be assembled and disassembled in a simple manner, within a short time and without the employment of skilled labor.

It is also an important object of the invention to produce a light weight delivery vehicle adapted to carry a payload which in weight is approximately equal to or not much lower than the weight of the entire vehicle.

It is another object of the invention to use for the construction and assembly of the vehic'e a large number of standard parts which are produced by mass production at low cost.

It is also an object of the invention to assemble the vehicle from units made of these parts in a novel and expeditious manner whereby time and mounting costs are saved.

It is a further object of the invention to improve the riding properties of this delivery vehicle and to suspend its impact sensitive parts in such a manner that concussions of the load will be prevented even when traveling over bad and rough terrain.

It is another object of the invention to employ individual mounting units for the assembly of the vehicle in a manner that will provide a maximum loading space for a minimum supported area.

It is also an object of the invention to provide an easy access to the loading space of the vehicle.

It is another object of the invention to provide an expeditious repair service for the vehicle based on the easy detachability of its assembly units.

With the above recited and additional objects in view which will become apparent as this description proceeds, the invention embraces as one of its important elements the subdivision of the chassis or understructure of the vehicle into three individual assembly units, viz. a centrally located frame structure, a frontal unit including the two front wheels and a rearwardly disposed power unit including the rear end of the vehicle and the driven rear wheel. The use of individual assembly units such as frontal drive units is known in the art. However, the combination of three distinct and self-contained assembly units as applied to the instant three-wheel delivery vehicle embodies numerous new and specific advantages in construction, operation and servicing as will be more fully described in the course of this specification.

The rearwardly disposed power unit which in addition to the driven rear wheel includes the driving engine, the transmission to the driven rear wheel and the rear end is mounted on a common cradle and thereby adapted to be easily attached to the central frame structure and equally easily detached from the same; the thus attained simple detachability of the power unit permits great ease of service and repair, as the majority of servicing and repair measures concern the elements embodied in the power unit; the operation of this unit is improved, the repairs are rendered inexpensive and less space is required for servicing as the unit only takes up a fraction of the space of the entire chassis or understructure; consequently stoppages of the vehicle operation and lay-offs because of repairs are greatly reduced or are entirely prevented by replacement with an easily installed spare power unit.

Another important feature of this invention comprises the mounting of the power unit in such a manner that its central axis is at an angular disposition within a horizontal plane relative to the longitudinal center axis of the vehicle. The center of gravity of the power unit or its vertical projection should coincide with the longitudinal center axis of the chassis.

A preferred embodiment of the invention is by way of example illustrated in the accompanying drawings.

In these drawings:

Fig. 1 is a general top plan view of the vehicle, the out'ine of the car body being indicated by a dotted line, Fig. 2 is a general side elevation of the same, the subdivision of the chassis in its components being indicated by broken lines and the rear portion of the car body being broken off to show the location of the driver's seat, Figs. 3 to 5 are an exploded top plan, and Figs. 6 to 8 are corresponding side elevations of the chassis or understructure, in particular.

Fig. 3 is a top plan view of the frontal steering unit including the two front wheels, Fig. 4 is a top plan view of the central frame structure and the steering gear mechanism supported thereon, Fig. 5 is a top plan view of the rearwardly disposed cradle supported drop-out power unit, Fig. 6 is a side elevation of the frontal assembly unit shown in Fig. 3, Fig. 7 is a side elevation of the central frame structure shown in Fig. 4, Fig. 8 is a side elevation of the drop-out power unit, shown in Fig. 5.

Fig. 9 is a top plan view of a part of the frontal assembly unit showing the front suspension of the vehicle, one front wheel being indicated by a dotted line, Fig. 10 is a cross sectional elevation on line 10 to 10 of Fig. 9, the front wheel being omitted in this figure, Fig. 11 is a top plan view showing the suspension of the rear end of the vehicle, Fig. 12 is a cross sectional elevation on line 12—12 of Fig. 11, Fig. 13 is a sectional exploded elevation on line 13—13 of Fig. 11, showing a structural detail of the suspension device, Fig. 14 is a vertical sectional elevation on line 14—14 of Fig. 1, showing the trough-shaped load compartment and its relationship to the front suspension, Fig. 15 is a side view, Fig. 16 is a rear view and Fig. 17 is a perspective view of a detachable rear portion of the car body at the same time forming the rear fender, the rear wheel being indicated by a dotted line, Fig. 18 is a vertical section on line 18 to 18 of Fig. 5, Fig. 19 is a top view of a structural detail shown in Fig. 18, and Fig. 20 is a sectional view of the resilient mounting of the rear end of the engine block.

In Figs. 1 and 2, A denominates the front assembly unit, B the central frame structure and C the cradle mounted power unit. These three units form the understructure or chassis proper of the instant three wheel automotive delivery vehicle.

The front assembly unit A includes the two front wheels 4 and 5; the wheels of this unit are suspended in bushings in a particular manner as later described in detail; the unit is otherwise steered in a conventional manner.

The power unit C includes the rear end of the vehicle and the rear wheel 6 which is driven.

The contours of the car body are indicated by a dotted line 10, Figs. 1, 2.

The frontal assembly unit

The frontal assembly unit A, which in Figs. 3 and 6 is shown as a separate unit, contains as a main structural element a cross beam 1. Two resilient bushings 7 and 8, Fig. 3, are attached to the two ends of this cross beam 1; these bushings are connected with arms 14 and 15. Attached to these arms by means of king pins 16, 17 are the two front wheels 4 and 5; also attached to the cross bar is the front bumper 18. This frontal unit A is fastened to the frame structure B by bolts 19 as in detail explained in a later part of this description.

The wheels of the frontal unit A are resiliently suspended; this frontal suspension is shown in Figs. 3, 6 and more in detail in Figs. 9 and 10; the suspension shown for one front wheel 4 is identical for both front wheels. Wheel 4 is in Fig. 9 indicated by a dotted line, but it is for clarity's sake, not shown in Fig. 10. Suspension arm 14 is pivoted about shaft 54; for this purpose the arm is attached by means of bracket 51 to the outer shell of the rubber bushing 7; a rubber sandwich 53, see Fig. 10, connects this outer shell to an inner shaft 54, which by bolts 55 is secured to brackets 56; these brackets are in turn attached to cross beam 1. The inner shaft 54 of bushing 7 is firmly connected with lever 58 which in a similar manner as later described for the suspension of the rear end of the vehicle is by a novel bolt construction 59 connected with beam 2 of the center frame structure B.

Attached to arm 14 is another arm 60 which holds king pin 16 and wheel hub 61. Arm 14 swings up and down with the movements of the wheel caused by road or load impacts; these movements are transmitted to the rubber bushing 7, from there to lever 58 and to the bolt assembly 59 and finally taken up by beam 2 of the central frame B.

Each front wheel is thus independently sprung and adjustments can be very easily made because of the bolt assembly later described in connection with the rear wheel 6.

Arm 14 is mounted in such a position and arm 60 is given such a bent-up shape that even under maximum load the highest part of this structure remains below a level indicated by line 62, see Fig. 10. This level is slightly below the bottom of the loading compartment 70; the bent-up shape of arm 60 therefore provides maximum clearance and establishes a maximum size load compartment space in the front of the vehicle.

The described construction is important because the space available in the front part of the vehicle wherein the payload is located, greatly governs the economy of the vehicle operation. Arm 60 carries a bracket 63, Figs. 3, 9 for connection with shock absorber 83, Fig. 4, which is of a conventional design.

The central frame structure

The central frame structure B which is shown as a separate unit in Figs. 4 and 7, consists of two longitudinal beams 2, 2ᵃ; this construction of the beams is correlated to the beams 24, 25 forming the cradle of the power unit C, as described in a later part of this specification.

A rectangular front cross beam 20ᵃ and a second rear cross beam 20, the latter being disposed at an angle relative to the longitudinal axis of the chassis and a short center beam 21 connecting the two cross beams complete the central frame structure B. Attached to center beam 21 is the steering post 22 which is placed on the approximate center of the chassis, A, B, C; rectangular cross beam 20ᵃ serves as a support for a center bracket 23 of the center point steering linkage.

After the frontal assembly unit A has been attached to the central frame structure B by bolts 19, power unit C is mounted as the final step in the assembly of the understructure or chassis of the vehicle.

The rearwardly disposed power unit

This power unit C is shown in Figs. 5 and 8 and certain structural details thereof are shown in Figs. 11 to 13 and 18 to 20. The power unit comprises a cradle 12, engine 11 and its transmission elements. The figures also show the rear end of the vehicle, the rear wheel 6 and means to secure the engine upon the vehicle frame; screws 13, Fig. 5, serve to connect the cradle 12 with the frame B.

The engine 11 is in the illustrated embodiment of the invention an opposed cylinder gasoline engine which is preferably air cooled; the engine is mounted at an angle $a$, which is formed by its longitudinal axis $\beta$—$\beta$ with the longitudinal center axis $\gamma$—$\gamma$ of the vehicle, this angle being projected in a horizontal plane, Fig. 5.

It is essential that the center of gravity of the power unit which is indicated at $\delta$ on its downward projection coincides with the longitudinal center axis $\gamma$—$\gamma$ of the vehicle to thereby obtain maximum equilibrium conditions of the vehicle and an even load distribution of the power unit.

This design incorporates a number of important advantages which are best apparent from a comparison with hitherto conventional mounting methods. In accordance with the latter, the engine would be mounted with its crankshaft axis either parallel or at right angles to the central vehicle axis. If mounted parallel then the central axis of the engine may coincide with the central axis of the vehicle; in a three wheeled vehicle of the here described type this would lead to the necessity to offset the transmission to the rear end by a gear or chain drive. If instead of coinciding the central axis of vehicle and of the engine, the engine would be offset sideways, then the equilibrium conditions of the vehicle will be seriously impaired. If, on the other hand, the engine is placed with the crankshaft at right angles relative to the central axis of the vehicle, then a double bevel gear drive or a chain drive will be required. Each of these constructions therefore necessitates substantially more numerous and more complicated parts than the rear angular location of the engine block adopted in the case of this invention, because by the use of this angular design disposed in a horizontal plane, a direct connection without intermediary chains or gears is rendered possible to the rear end and the equilibrium requirements are fully preserved. A hypoid rear end drive 85, Fig. 5 transmits the engine power to the rear wheel 6 with the pinion above the center of the rear wheel; by this construction a particularly advantageous type of suspension is made possible of the engine block, which will be more fully described later on.

The cradle 12 is, as previously stated, composed of two longitudinal beams 24 and 25 of unequal length, which are connected with beams 2, 2ª of the frame structure B, and of a cross beam 3; the unequal length of beams 24, 25 is caused by the angular disposition of the engine and also by the fact that the rear portion of beams 24, 25 serves to support the safety stop and bumper for the rear suspension. Cradle 12 is in the assembled state of the chassis A, B, C mounted on frame structure B, in a manner shown in detail in Figs. 18, 19 and 20.

In these figures the beams 2, 2ª Figs. 18, 19 of the frame structure B are located at the outside and the cradle beams 24 and 25 of power unit C at the inside of the supporting side structure. The cradle, which includes beams 24, 25, is fastened to the beams 2, 2a by two sets of four bolts 26. These bolts are subdivided into horizontal and vertical groups. Attached to beams 24 and 25 are brackets 28; these brackets carry resilient mounts 29 to reduce the transmission of the engine vibration to the chassis. Attached to the upper part of resilient mounts 29 are brackets 30 which in turn either form part of or are attached to the engine block indicated by partly broken and partly dotted outline 31.

A third resilient mount 33 is provided, which is attached to the rear portion 31 of the engine or its transmission and to cross beam 3, Fig. 20; in this manner the engine is supported by a three-point rubber suspension which is solely attached to cradle 12.

It is important in any such design that the power unit can be attached or detached in a minimum of time and it is particularly important that this can be achieved even after the vehicle has run for some time when its parts are covered with mud.

In order to prevent the binding together of the power unit C and the frame structure B the following simple and efficient construction has been devised; for this purpose the cradle beams 24, 25 are provided with inner indentations 32 which abut against the beams of frame B thus locating the frame in position but preventing its binding together with the power unit; in this manner easy detachability of the two units is secured.

For attachment of the cradle supported power unit C to frame structure B the latter is moved into the position shown in Fig. 18 with the cradle spaced from the frame structure. The cradle is then lowered onto the frame B and its beams 2, 2ª and the various bolts 26 are inserted. Thus the cradle slides freely into its proper position and is secured in the final assembling step only.

The engine 11 is, as mentioned before, resiliently mounted on cradle 12 at three points. The transmission to the driven wheel may be connected with the engine to form one block and a short shaft with two universals may connect the rear end to the transmission. This rear end portion 34 which is indicated by a dotted line in Figs. 11 and 12, is attached to the rear end suspension arm 35. This arm is swingably mounted by means of rubber bushing 9; this bushing consists of an outer shell, of an inner shaft 39 and rubber sleeve 38 sandwiched therebetween; the outer shell is welded to the arm 35 and this connection is reinforced by bracket 37; shaft 39 is fastened by screws 40 to brackets 41, which in turn are attached to cross beam 3 of cradle 12 of the power unit C.

The up and down movement of the wheel 6 causes the rear end 34 to impart an angular movement to swinging arm 35 and in turn to twist rubber bushing 9. This twist is transmitted to lever 42 which is firmly connected to the inner shaft 39 of rubber bushing 9. Lever 42 is by means of screw 43 held in firm contact with angle iron 45 attached to beam 24. The contacting surfaces of angle iron 45 and of lever 42 Fig. 13 are provided with serrations 44. The slot 46 of lever 42, through which screw 43 is to be inserted is oblong and therefore permits the end of the lever 42 to be height-varied in its position relative to beam 3; therefore by vertically displacing the end of lever 42 relative to beam 24 it is possible to adjust the tension and position of rubber bushing 9; nevertheless and because of the serrations 44 a firm grip is secured between the lever and the cradle of the power unit C.

Rear end 34 which is indicated by a dotted line is so designed that wheel 6 can be attached by bolts from one side in the manner which is conventional in automobiles; in most three wheel vehicles, such as motorcycles, the single wheel is held from two sides; however, this design while convenient for some applications has the disadvantage of making the changing of the tires very difficult. Therefore, a one sided connection has been chosen for the wheel 6 to the rear end portion 34 by which the wheel can be attached by conventional bolts and nuts. This design is the more advantageous as it is practically identical, at least in its essentials, with the front wheel construction, where the two arms 14, 15 are attached in a similar manner to the two bushings 7, 8, Figure 3.

It is apparent from the above, that the assembly of the vehicle chassis is a matter of greatest simplicity and expediency and can be completed within a very short time.

First, the frontal unit A is attached by screws 19 to the centrally disposed frame structure B, then the cradle supported power unit C is slid onto the beams 2, 2ª of frame structure B and fastened thereto by bolts 26 as the final step in the completion of the assembly of the chassis.

The design of the loading compartment 70, Fig. 14 also follows novel constructional principles and is particularly adapted for the purposes of a three wheel delivery vehicle. It is formed of the front portion of the car body and has the shape of a trough with a hat section of high rigidity; the platform extends beyond the frame; thus, the body overhangs by several inches and the self supporting feature of the trough is utilized.

The advantage of this design of the body is a lighter construction, as part of the supporting frame is saved; it also makes the design simpler and increases the loading capacity. Cross bar 1 is determined in its position by the chassis construction including the predetermined wheel base; if the frame would extend frontwards past the cross beam in order to support the overhanging part of the load compartment, a much more intricate design of this cross beam would be required.

As previously mentioned, the power unit C of the vehicle can be detached by drawing it out towards the rear. In order to permit this with the body in place, a detachable lower rear body portion is provided, which is shown in Figs. 15, 16, 17. This rear portion of the car body represents at the same time the rear fender 80 for the rear wheel 6. The rear fender 80 is made easily detachable; it is held by two pegs 81 at its lower edge and its upper portion is secured to the portion of the main car body by two anchoring screws 82; the rear fender 80 will also be detached if a tire is changed or the rear end needs servicing.

The hereinbefore described vehicle construction admits of considerable modification without departing from the spirit of this invention. Therefore it is understood that the invention is not to be limited to the precise arrangements shown and described, which are by way of illustration merely. The scope of protection it to be taken solely from the appended claims.

We claim:

1. In a three-wheel automotive delivery vehicle an understructure mainly consisting of two longitudinal parallel side beams of unequal length, a frontal vehicle body supported on said understructure, a cradle composed of two parallel longitudinal side beams and reinforced by a cross piece supported by the rear end of said understructure side beams, a power unit supported on said cradle, said power unit including a driving engine, a rear-end portion and a driven wheel, means to support said wheel in said rear-end portion and transmission means operatively connecting said engine and said rear wheel, said power unit being supported on said cradle with its longitudinal center axis forming an acute angle with the longitudinal vehicle axis and said angle extending in a substantially horizontal plane.

2. In a three-wheel automotive delivery vehicle an understructure mainly consisting of two longitudinal parallel side beams of unequal length, a frontal vehicle body supported on said understructure, a cradle composed of two parallel longitudinal side beams and reinforced by a cross piece supported by the rear-end of said understructure side beams, a power unit supported on said cradle, said power unit including a driving engine, a rear-end portion and a driven wheel, means to support said wheel in said rear-end portion and transmission means operatively connecting said engine and said rear wheel, said power unit being supported on said cradle with its longitudinal center axis forming an acute angle with the longitudinal vehicle axis and said angle extending in a substantially horizontal plane, the side beams of the understructure and the side beams of the cradle being shaped for slidable superimposition and indentations at the contacting faces of said beams to prevent binding together of said understructure and said cradle during use of the vehicle and to preserve their easy detachability.

3. In a three-wheel automotive delivery vehicle an understructure mainly consisting of two longitudinal parallel side beams of unequal length, a frontal vehicle body supported on said understructure, a cradle composed of two parallel longitudinal side beams supported by the rear end of said understructure side beams, a power unit supported on said cradle, said power unit including a driving engine, a rear-end portion and a driven wheel, means to support said driven wheel in said rear-end portion and transmission means operatively connecting said engine and said rear wheel, said power unit being supported on said cradle with its longitudinal center axis forming an acute angle with the longitudinal vehicle axis and said angle extending in a substantially horizontal plane, the downward projection of the center of gravity of said power unit coinciding with the longitudinal center axis of the vehicle.

4. In a three-wheel automotive delivery vehicle an understructure mainly consisting of two longitudinal parallel side beams of unequal length, a frontal vehicle body supported on said understructure, a cradle composed of two parallel longitudinal side beams and reinforced by a cross piece supported by the rear-end of said understructure side beams, a power unit supported on said cradle, said power unit including a driving engine, a rear-end portion and a driven wheel, means to support said driven wheel in said rear-end portion and transmission means operatively connecting said engine and said rear wheel, said power unit being supported on said cradle with its longitudinal center axis forming an acute angle with the longitudinal vehicle axis and said angle extending in a substantially horizontal plane, the downward projection of the center of gravity of said power unit coinciding with the longitudinal center axis of the vehicle, an arm attached with its one end to the cross piece of said cradle, the other end of said arm being attached to said rear-end portion, a cylindrical rubber cushion located between the end of said arm and said rear-end portion, the latter being connected with the rear wheel exclusively on the one side thereof and leaving the other side of the wheel free for its attachment.

WILLIAM S. TANDLER.
FERDINAND A. DE WEISS.
DAVID S. WALKER.
JOHN L. FRERING.

REFERENCES CITED

The following references are of record in the file of this patent:

UNITED STATES PATENTS

| Number | Name | Date |
|---|---|---|
| 788,852 | Sechaud | May 2, 1905 |
| 1,121,256 | Kelsey | Dec. 15, 1914 |
| 1,424,867 | | |
| 1,471,879 | | |
| 2,019,139 | | |
| 2,099,703 | | |
| 2,166,774 | | |
| 2,226,406 | | |
| 2,238,879 | | |
| 2,275,050 | | |
| 2,322,477 | | |
| 2,383,611 | | |
| | Wolf | Aug. 8, 1922 |
| | Billings | Oct. 23, 1923 |
| | Kliesrath | Oct. 29, 1935 |
| | Paton | Nov. 23, 1937 |
| | Tjaarda | July 18, 1939 |
| | Krotz | Dec. 24, 1940 |
| | Dauben | Apr. 22, 1941 |
| | Lewis | Mar. 3, 1942 |
| | Sjoberg | June 22, 1943 |
| | Marcy | Aug. 28, 1945 |

FOREIGN PATENTS

| Number | Country | Date |
|---|---|---|
| 181,789 | Great Britain | June 15, 1922 |